United States Patent
Cheng

(10) Patent No.: US 8,878,837 B2
(45) Date of Patent: Nov. 4, 2014

(54) IMAGE PROCESSING APPARATUS HAVING ON-SCREEN DISPLAY FUNCTION AND METHOD THEREOF

(75) Inventor: Kun-Nan Cheng, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 655 days.

(21) Appl. No.: 12/977,142

(22) Filed: Dec. 23, 2010

(65) Prior Publication Data

US 2011/0157166 A1    Jun. 30, 2011

(30) Foreign Application Priority Data

Dec. 25, 2009  (TW) .............................. 98144980 A

(51) Int. Cl.
*G06T 15/00* (2011.01)
*H04N 13/00* (2006.01)

(52) U.S. Cl.
CPC .................................... *H04N 13/007* (2013.01)
USPC .................. 345/419; 345/87; 345/418; 345/8; 348/43; 348/51; 348/239; 382/154

(58) Field of Classification Search
CPC ..... H04N 13/004; G06F 17/214; G06T 15/00
USPC ............ 345/418, 419, 87, 8; 348/43, 51, 239; 382/154
See application file for complete search history.

(56) References Cited

U.S. PATENT DOCUMENTS

| | | | |
|---|---|---|---|
| 5,933,127 A * | 8/1999 | DuBois ........................... | 345/87 |
| 6,704,042 B2 * | 3/2004 | Matsui et al. ................... | 348/43 |
| 6,891,518 B2 * | 5/2005 | Sauer et al. ....................... | 345/8 |
| 7,693,221 B2 * | 4/2010 | Routhier et al. ......... | 375/240.26 |
| 8,259,162 B2 * | 9/2012 | Kim et al. ....................... | 348/51 |
| 8,417,024 B2 * | 4/2013 | Mashitani et al. ............. | 382/154 |
| 8,436,918 B2 * | 5/2013 | Claydon et al. ............... | 348/239 |
| 8,531,448 B2 * | 9/2013 | Takemoto et al. ............ | 345/419 |
| 8,558,830 B2 * | 10/2013 | Blumenthal et al. .......... | 345/419 |

FOREIGN PATENT DOCUMENTS

CN    101543085 A    9/2009

OTHER PUBLICATIONS

Chinese Office Action dated Apr. 24, 2012, 6 pages.

* cited by examiner

*Primary Examiner* — Phu K Nguyen
(74) *Attorney, Agent, or Firm* — Edell, Shapiro & Finnan LLC

(57) ABSTRACT

An image processing apparatus having an on-screen display (OSD) function includes a processing circuit and an OSD circuit. The OSD circuit generates OSD data, and the on-screen data comprises left-eye display data and right-eye display data. The processing circuit processes image data, which comprises left-eye image data and right-eye image data, and respectively blends the left-eye and right-eye display data of the OSD data with the left-eye and right-eye image data of the image data to generate combined image data.

16 Claims, 12 Drawing Sheets

|   |   |   |   |       |   |   |   |   |
|---|---|---|---|-------|---|---|---|---|
| L | L | L | L |       | R | R | R | R |
| L | L | L | L |       | R | R | R | R |
| L | L | L | L |       | R | R | R | R |
| L | L | L | L |       | R | R | R | R |

|   |   |   |   |       |   |   |   |   |
|---|---|---|---|-------|---|---|---|---|
| L | R | L | R |       | R | L | R | L |
| L | R | L | R |       | R | L | R | L |
| L | R | L | R |       | R | L | R | L |
| L | R | L | R |       | R | L | R | L |

|   |   |   |   |       |   |   |   |   |
|---|---|---|---|-------|---|---|---|---|
| L | R | L | R |       | R | L | R | L |
| R | L | R | L |       | L | R | L | R |
| L | R | L | R |       | R | L | R | L |
| R | L | R | L |       | L | R | L | R |

IMAGE PROCESSING APPARATUS HAVING ON-SCREEN DISPLAY FUNCTION AND METHOD THEREOF

CROSS REFERENCE TO RELATED PATENT APPLICATION

This patent application is based on Taiwan, R.O.C. patent application No. 98144980 filed on Dec. 25, 2009.

FIELD OF THE INVENTION

The present invention relates to an on-screen display (OSD) scheme, and more particularly, to an image processing apparatus, having an OSD function, applied to a three-dimensional (3D) stereo display and a method thereof.

BACKGROUND OF THE INVENTION

A principle of a stereo image display technique is that image frames of different visual angles are received by a left eye and a right eye of an observer who may accordingly perceive a stereo image. In practice, two approaches are applied to meet the foregoing requirement. A first approach is to implement stereo shutter open/closed display glasses. Since left-eye image frames and right-eye image frames are in sequence displayed via an interleaving manner, the stereo shutter open/closed display glasses continuously switches between open and closed statuses, so that the left eye perceives the left-eye images frames and the right eye perceives right-eye image frames to display the stereo image. A second approach is to implement a raster or a lens on a panel to achieve an object that the left eye perceives the left-eye images frames and the right eye perceives right-eye image frames. The stereo image display technique is currently developed with respect to both of the foregoing two approaches.

SUMMARY OF THE INVENTION

The present invention is mainly applied to the stereo image display technique achieved by implementing a raster or a lens on a panel or stereo shutter open/closed display glasses. One object of the present invention is to provide an image processing apparatus and a method thereof having an OSD function, such that an observer is capable of perceiving a stereo OSD when viewing a stereo image frame. A scope of the OSD includes a screen function list on a screen display, a system status (e.g., volume, luminance, a television (TV) channel number or source information), a built-in caption of a video, display content and a format in advance designed by system software.

According to an embodiment of the present invention, an image processing apparatus having an OSD function comprises a processing circuit and an OSD circuit, which is for generating an OSD data to the processing circuit. The OSD data comprises left-eye display data and right-eye display data. The processing circuit processes image data comprising left-eye image data and right-eye image data, and respectively blends the left-eye display data and the right-eye display data of the OSD data with the left-eye image data and the right-eye image data of the image data to generate combined image data.

According to another embodiment of the present invention, a method for an image processing apparatus having an OSD function comprises generating an OSD data comprising left-eye display data and right-eye display data; providing image data comprising left-eye image data and right-eye image data; and blending the left-eye display data and the right-eye display data of the OSD data with the left-eye image data and the right-eye image of the image data to generate combined image data.

BRIEF DESCRIPTION OF THE DRAWINGS

FIG. 2A to FIG. 2C are respectively schematic diagrams of data formats of different stereo image displays.

DETAILED DESCRIPTION OF THE PREFERRED EMBODIMENT

Figure 1:
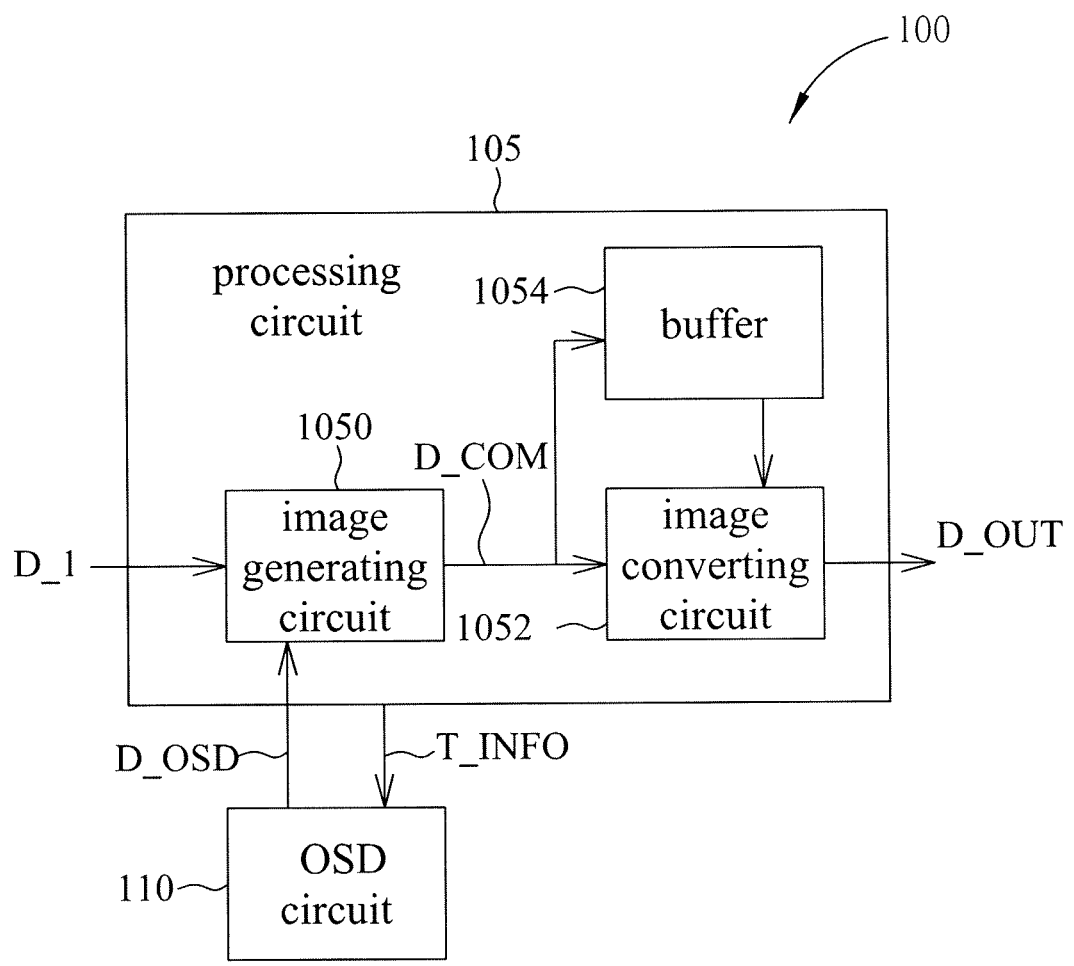
FIG. 1 is a schematic diagram of an image processing apparatus having an OSD function in accordance with a first embodiment of the present invention.

FIG. 1 shows a schematic diagram of an image processing apparatus 100 having an OSD function in accordance with a first embodiment of the present invention. The image processing apparatus 100 comprises a processing circuit 105 and an on-screen display (OSD) circuit 110. The processing circuit 105 comprises an image generating circuit 1050, an image converting circuit 1052, and a buffer 1054. The processing circuit 105 processes image data D_1 comprising a plurality of left-eye image data L_1 to L_N and a plurality of right-eye image data R_1 to R_N, where N is an integer larger than or equal to 2, and the plurality of left-eye image data L_1 to L_N and the plurality of right-eye image data R_1 to R_N are processed by the processing circuit 105 via an interleaving manner, i.e., the processing circuit 105 in sequence processes the left-eye and right-eye image data of the image data D_1 according to a sequence of L_1, R_1, L_2, R_2, ..., L_N and R_N. The left-eye image data (or a so-called left-eye image) L_1 and the right-eye image data (or a so-called right-eye image) R_1 are a pair of image data and belong to two frames at a same time point T1, and other pairs of left-eye and right-eye image data have identical characteristics.

It is to be noted that, the image processing apparatus 100 according to the present invention may collocate with a display (not shown in FIG. 1) having different data formats of stereo image display, and the data formats need to match with devices of the display, e.g., a raster on a panel, directive backlight, lens and glasses shutter. At different time points, the foregoing devices project an image into a left eye or a right eye, and thus the data formats need to match with the devices for projecting the left-eye image into the left-eye or projecting a right-eye image into the right eye. FIGS. 2A to 2C show schematic diagrams of different data formats of stereo image display. The data format in FIG. 2A represents that data of an image frame F_0 are for left-eye images and represented by symbols L, and data of an image frame F_1 are right-eye images and represented by symbols R. In practical applications, a user can observe the stereo image having the data format as shown in FIG. 2A by using stereo glasses having a left shutter and a right shutter. The data format in FIG. 2B represents that, for images on each horizontal line of the image frame F_0, pixel data of left-eye images and right-eye images (respectively represented by symbols L and R) are interleaving arranged, and data on a same vertical line are pixel data of left-eye images or are pixel data of right-eye images. In the image frame F_1, for data at same positions of the image frame F_0 and the image frame F_1, the pixel data of left-eye images are changed to the pixel data of right-eye images, or the pixel data of right-eye images are changed to the pixel data of left-eye images. The data format in FIG. 2C represents that, for data on each horizontal line and each vertical line of the image frame F_0, the pixel data of the left-eye images and the pixel data of the right-eye images (respectively represented by symbols L and R) are interleaving displayed, and for data on each horizontal line and each vertical line of the image frame F_1, the pixel data of the left-eye images and the pixel data of the right-eye images are also interleaving displayed. However, for data at same positions of the image frame F_0 and the image frame F_1, the pixel data of left-eye images are changed to the pixel data of right-eye images, or the pixel data of right-eye images are changed to the pixel data of left-eye images. Therefore, the processing circuit 105 according to the present invention performs appropriate image converting on the image data D_1 according to the data format of stereo image display of the display, so that the processed image data D_1 can match with the data format of the collocated display. In practice, operations of the image converting are completed by the image converting circuit 1052 of the processing circuit 105.

Upon receiving the image data D_1, the processing circuit 105 informs the OSD circuit 110 of timing information T_INFO of left-eye and right-eye image data of the image data D_1, and thus the OSD circuit 110 transmits corresponding left-eye and right-eye display data according to the timing information T_INFO to the processing circuit 105. For example, in order to follow the sequence of left-eye/right-eye image data L_1, R_1, L_2, R_2, ..., L_N and R_N received by the processing circuit 105, OSD data D_OSD outputted by the OSD circuit 110 is for correspondingly interleaving transmitting left-eye/right-eye display data to the image generating circuit 1050, which performs image blending on the image data D_1 and the OSD data D_OSD to generate combined image data D_COM. For example, according to the transmission sequence of the image data, the image generating circuit 1050 performs image blending on the plurality of left-eye image data L_1 to L_N and a plurality of left-eye display data LD_1 to LD_N respectively to generate a plurality of left-eye combined image data D_L1 to D_LN, and performs image blending on the plurality of right-eye image data R_1 to R_N and a plurality of right-eye display data RD_1 to RD_N respectively to generate a plurality of right-eye combined image data D_R1 to D_RN. The foregoing plurality of left-eye combined image data $D\_L_1$ to D_LN and the plurality of right-eye combined image data D_R1 to D_RN are in sequence interleaved to form the combined image data D_COM. The image converting circuit 1052 coupled to the image generating circuit 1050 and the buffer 1054 converts the combined image data D_COM to an output image data D_OUT according to the foregoing data format of stereo image display of the display.

Figure 3A:
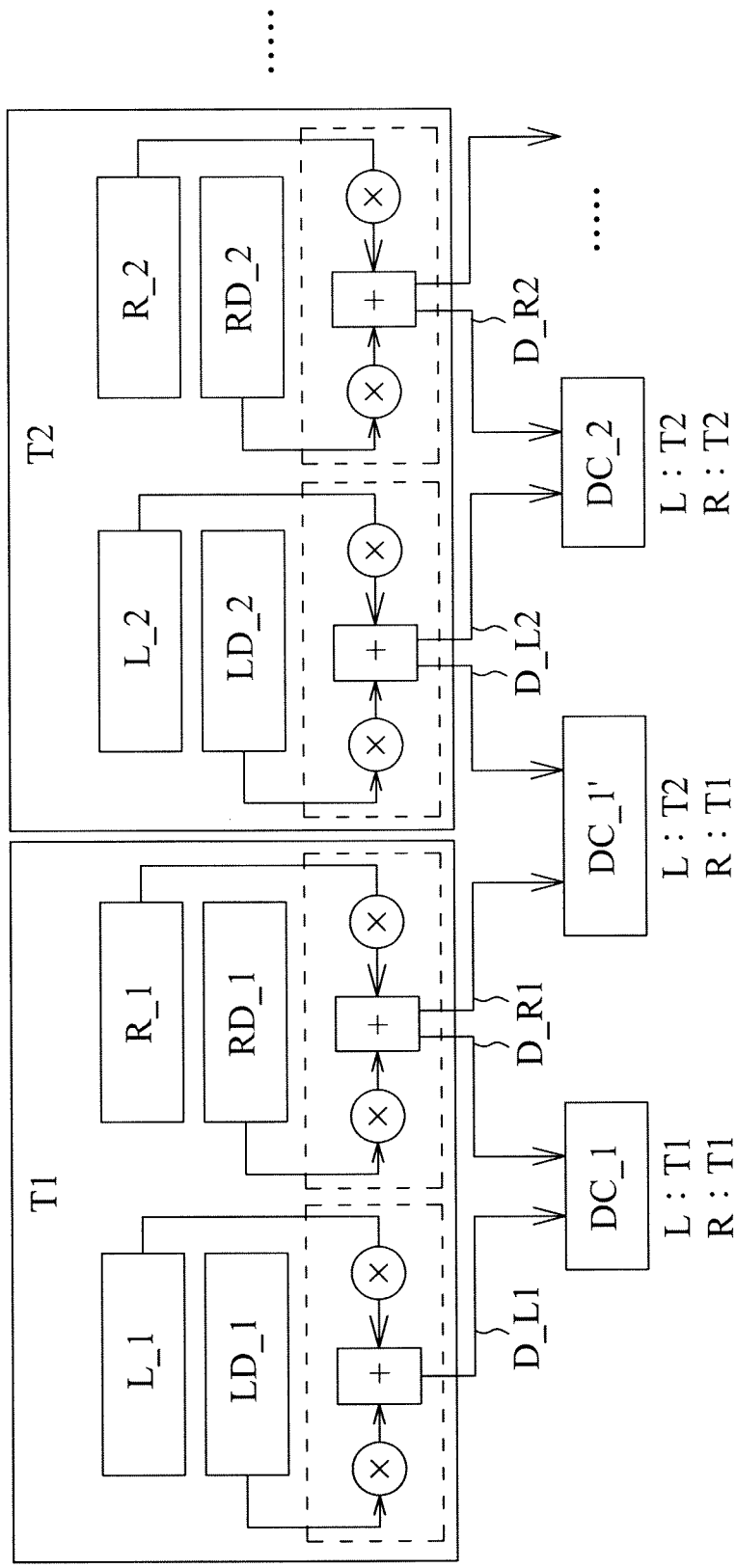
FIG. 3A is a schematic diagram of operations of a processing circuit of the image processing apparatus in FIG. 1 in accordance with an embodiment of the present invention.

In this embodiment, the image converting circuit 1052 converts the data format of each left-eye combined image data and one corresponding right-eye combined image data of the combined image data D_COM according to the foregoing data format of stereo image display of the display to generate the output image data D_OUT. FIG. 3A shows operations of the processing circuit 105 in FIG. 1 in accordance with an embodiment of the present invention. The image generating circuit 1050 performs image blending, i.e., the image generating circuit 1050 first respectively multiplies pixel values of the left-eye image data L_1 and the left-eye display data LD_1 by respective weight values, and then adds the two products to obtain the left-eye combined image data D_L1. Likewise, the image generating circuit 1050 performs image blending, i.e., the image generating circuit 1050 first respectively multiplies pixel values of the right-eye image data R_1 and the right-eye display data RD_1 by respective weight values, and then adds the two products to obtain the right-eye combined image data R_L1. It is to be noted that, the left-eye image data D_L1 generated by the image generating circuit 1050 is temporarily stored into the buffer 1054, and only when the image generating circuit 1050 generates and outputs the right-eye combined image data D_R1 to the image converting circuit 1052, the image converting circuit 1052 converts the data format of the left-eye combined image data D_L1 temporarily stored in the buffer 1054 and the received right-eye combined image data D_R1 to generate a converted image data DC_1, e.g., a data format of the converted image data DC_1 is one of the data format of the frame F_0 in FIG. 2B or FIG. 2C. Then, the right-eye combined image data D_R1 is temporarily stored in the buffer 1054, and only when the image generating circuit 1050 transmits the left-eye combined image data D_L2 generated according to the left-eye image data L_2 and the left-eye display data LD_2 at a time point T2 to the image converting circuit 1052, the image converting circuit 1052 generates a converted image data DC_1' according to the right-eye combined image data D_R1 and the left-eye combined image data D_L2, e.g., a data format of the converted image data DC_1' is one of the data format of the frame F_1 in FIG. 2B or FIG. 2C. The converted image data DC_1, DC_1', DC_2, DC_2'..., and DC_N form the foregoing output image data D_OUT. It is to be noted that, the right-eye combined image data D_R1 and the left-eye combined image data D_L2 belong to or correspond to image data at different time points (e.g., T1 and T2); however, image quality observed by eyes of human beings is not over-affected, i.e., the image quality is acceptable for eyes of human beings. For the buffer 1054, only combined image data at a previous time point needs to be temporarily stored, and thus reducing storage space of the buffer 1054.

Figure 3B:
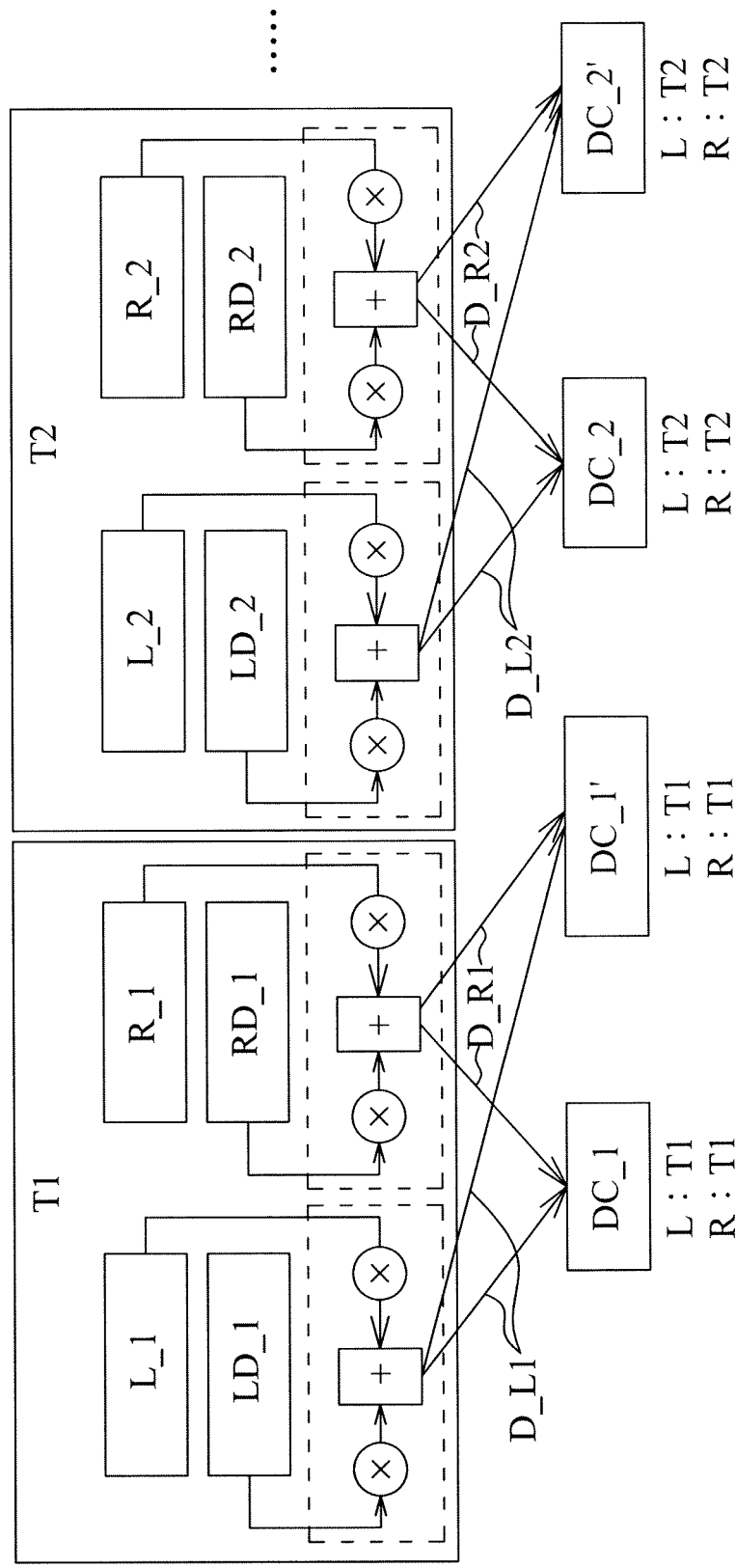
FIG. 3B is a schematic diagram of operations of a processing circuit of the image processing apparatus in FIG. 1 in accordance with another embodiment of the present invention.

FIG. 3B shows operations of the processing circuit 105 in FIG. 1 in accordance with another embodiment of the present invention. The image converting circuit 1052 changes to convert a data format of left-eye combined image data and right-eye combined image data at a same time point of the combined image data D_COM to generate output image data. The left-eye combined image data D_L1 generated by the image generating circuit 1050 is temporarily stored in the buffer 1054, and only when the image generating circuit 1050 generates and outputs the right-eye combined image data D_R1 to the image converting circuit 1052, the image converting circuit 1052 converts the data format of the let-eye combined image data D_L1 and the right-eye combined image data D_R1 to generate a converted image data DC_1, e.g., a data format of the converted image data DC_1 may be one of the data formats of the frame F_0 in FIG. 2B or FIG. 2C. Then, the image generating circuit 1050 generates a converted image data DC_1' according to the left-eye combined image data D_L1 and the right-eye image data D_R1, e.g., a data format of the converted image data DC_1' is one of the data formats of the frame F_1 in FIG. 2B or FIG. 2C. Therefore, the left-eye combined image data D_L1 and the right-eye combined image data D_R1 need to be simultaneously stored in the buffer 1054, i.e., the buffer 1054 needs to temporarily store the left-eye combined image data and the right-eye combined image data at a same time point.

In an embodiment, the image processing apparatus 100 according to the present invention generates the data formats as shown in FIG. 2A and FIG. 2B, so that an observer may observe a stereo image via stereo glasses. The image converting circuit 1052 is used for adjusting the frame rate of the combined image data D_COM to generate the output image data D_OUT having a proper frame rate and proper vertical blanking intervals (VBIs). In another embodiment, when the image processing apparatus 100 according to the present invention 100 is applied to generate the data formats as shown in FIG. 2A and FIG. 2B, the image converting circuit 1052 can directly output the combined image data D_COM as the output image data D_OUT.

Figure 4A:
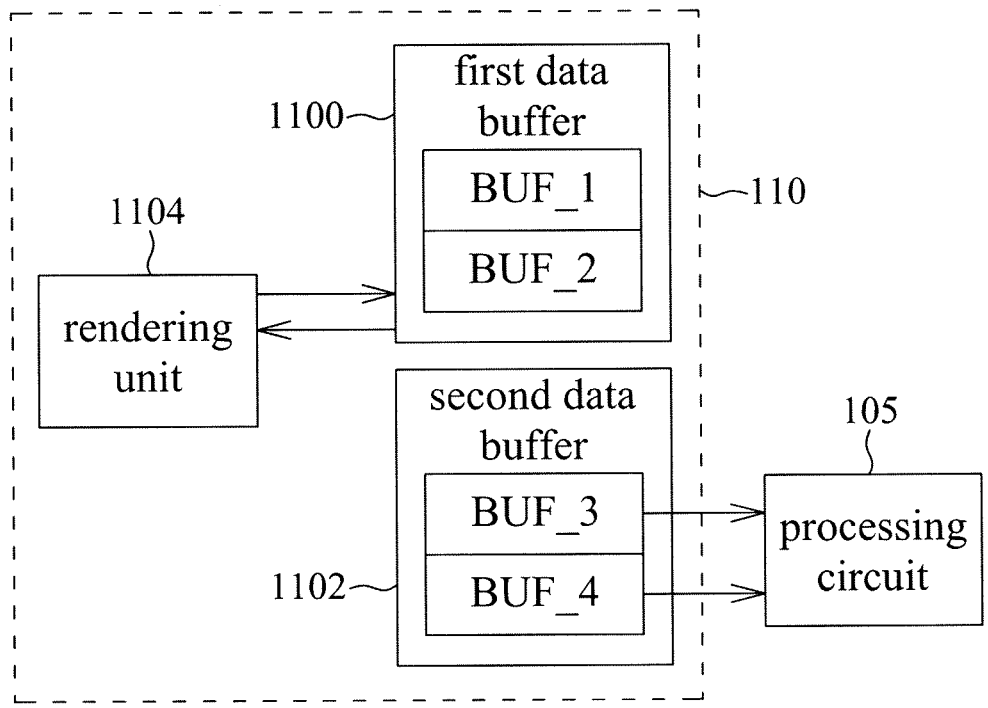
FIGS. 4A and 4B are schematic diagrams of operations of an OSD circuit of the image processing apparatus in FIG. 1 in accordance with an embodiment of the present invention.
Figure 4B:
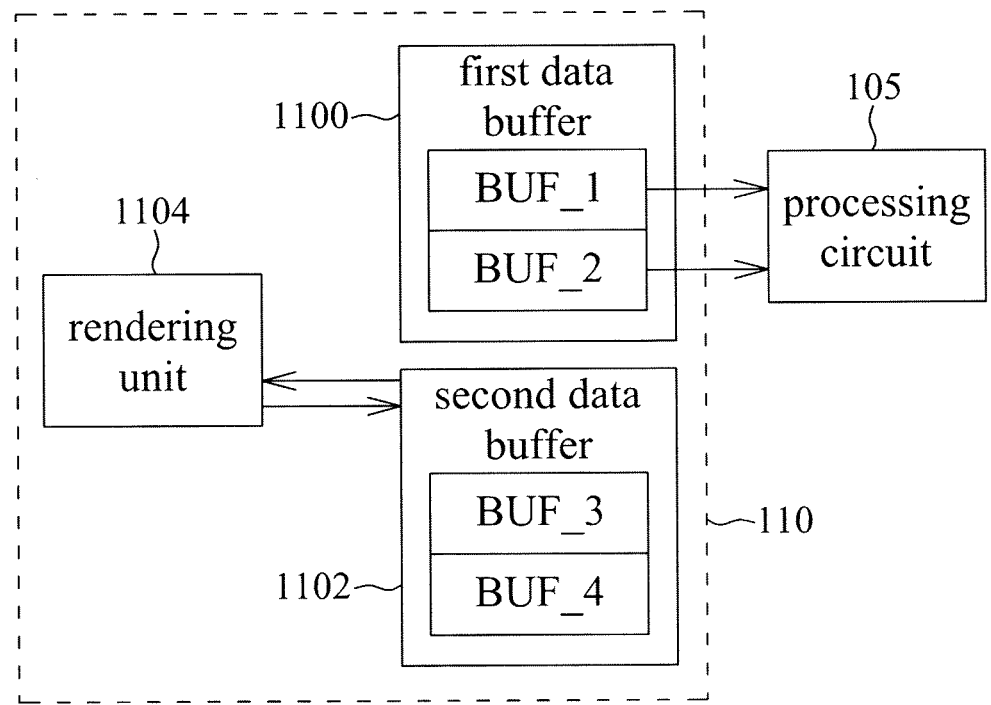

FIGS. 4A and 4B are schematic diagrams of operations of the OSD circuit 110 in FIG. 1 in accordance with an embodiment of the present invention. The OSD circuit 110 comprises a first data buffer 1100, a second data buffer 1102 and a rendering unit 1104. The rendering unit 1104 coupled to the first buffer 100 and the second buffer 102, respectively, renders the display data D_OSD comprising the plurality of left-eye display data LD_1 to LD_N and the plurality of right-eye display data RD_1 to RD_N. The first data buffer 1100 comprises a left-eye data buffering area BUF_1 and a right-eye data buffering area BUF_2, and the second data buffering area 1102 comprises a left-eye data buffer area BUF_3 and a right-eye data buffering area BUF_4. Since a rendering speed of the rendering unit 1104 is different from a speed for receiving the display data D_OSD by the processing circuit 105, and generally, the rendering speed of the rendering unit 1104 is lower than the speed for receiving/processing data by the processing circuit 105, two buffers (i.e., the first data buffer 1100 and the second data buffer 1102) are designed according to the present invention. More specifically, the rendering unit 1104 first renders an image of an OSD data into a data buffer, transmits the rendered image into the processing circuit 105 for access when the image is completely rendered, and then continues to render another image of a subsequent OSD data into another data buffer. Therefore, although the rendering speed of the rendering unit 1104 is lower than the image data processing speed of the processing circuit 105, a speed for outputting the display data D_OSD by the OSD circuit 110 is still synchronous with that for receiving the image data D_1 by the processing circuit 105.

More specifically, referring to FIG. 4A, when the rendering unit 1104 respectively writes the left-eye display data and the right-eye display data to the left-eye data buffering area BUF_1 and the right-eye data buffering area BUF_2 of the first data buffer 1100, the processing circuit 105 accesses data stored in the second data buffer 1102, which accordingly outputs corresponding display data according to timing information T_INFO to the processing circuit 105. When the rendering unit 1104 completes writing the left-eye and right-eye display data into the first data buffer 1000, and the processing unit 105 completes accessing one pair or numerous pairs of left-eye and right-eye display data, the rendering unit 1104 switches to write next left-eye and right-eye display data into the left-eye data buffering area BUF_3 and the right-eye data buffering area BUF_4 of the second data buffer 1102, and the processing unit 105 switches to access the left-eye and right-eye display data stored in the left-eye data buffering area BUF_1 and the right-eye data buffering area BUF_2 of the first data buffer 1000.

Figure 5:
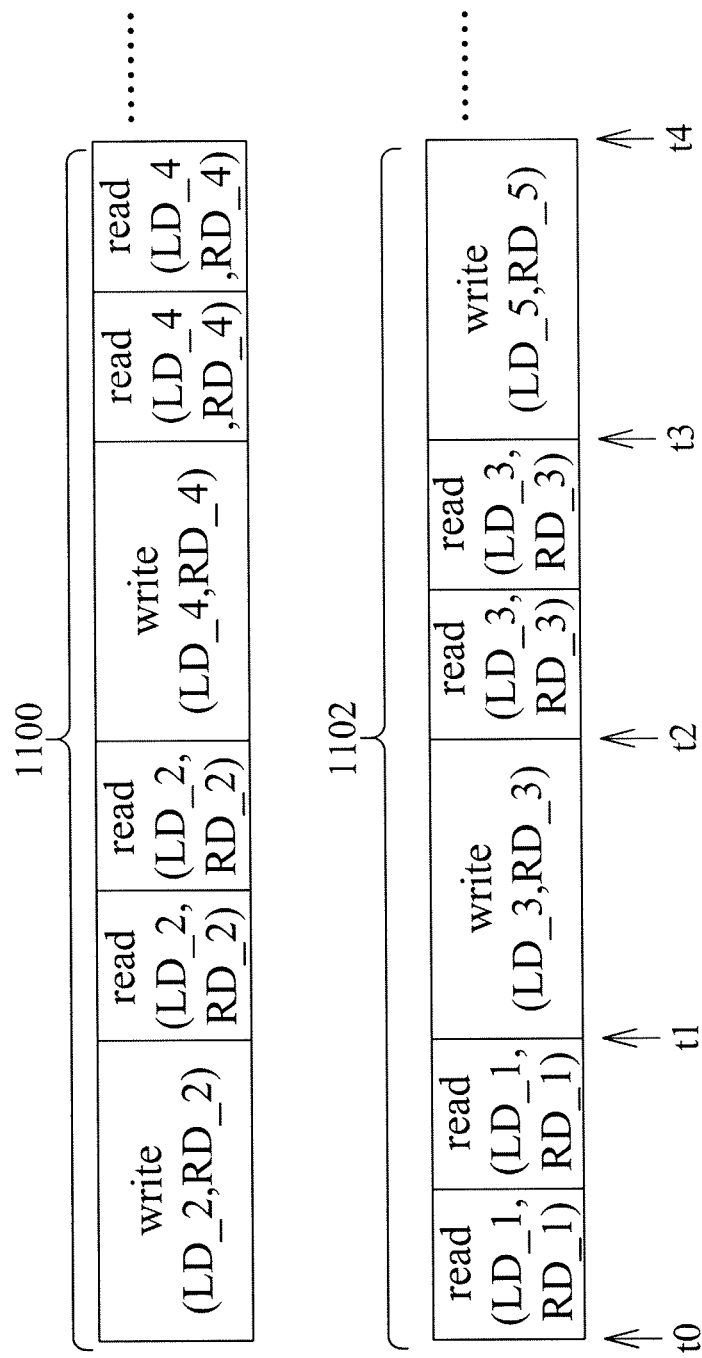
FIG. 5 is a schematic diagram of access statuses of a first data buffer and a second data buffer in FIG. 4A to FIG. 4B in accordance with an embodiment of the present invention.

FIG. 5 shows a schematic diagram of access statuses of the first data buffer 1100 and the second data buffer 1102 in accordance with an embodiment of the present invention. During a period from a time point t0 to a time point t1, the rendering unit 1104 writes and temporarily stores the rendered left-eye and right-eye display data LD_2 and RD_2 into the first data buffer 1100, and the processing circuit 105 accesses the second data buffer 1102 to read out the previous left-eye and right-eye display data LD_1 and RD_1 temporarily stored in the second data buffer 1102. In this embodiment, supposing that the processing speed of the processing circuit 105 is twice the rendering speed of the rendering unit 1104, and thus the processing circuit 105 accesses twice the left-eye and right-eye display data LD_1 and RD_1 during the time point t0 to the time point t1, and performs image blending on the accessed display data LD_1 and RD_1 with the received left-eye and right-eye image data L_1, L_2, and R_2. That is, each left-eye or right-eye display data generated by the rendering unit 1104 is blended to two different pairs of left-eye and right-eye image data. The rendering unit 1104 completes rendering the left-eye and right-eye display data LD_2 and RD_2 at the time point t1. After the processing circuit 105 completes accessing the current paired left-eye and right-eye display data, the rendering unit 1104 and the processing circuit 105 exchange the data buffers. That is, the processing circuit 105 changes to access the first buffer 1100 to access the left-eye and right-eye display data LD_2 and RD_2 temporarily stored in the first data buffer 1100, and performs image blending on the accessed display data LD_2 and RD_2 and corresponding left-eye and right-eye image data L_3, R_3, L_4 and R_4. The rendering unit 1104 writes the rendered left-eye and right-eye display data LD_3 and RD_3 into the second data buffer 1102. Therefore, during the time point t1 to the time point t2, the processing circuit 105 accesses twice the first data buffer 1100, and the rendering unit 1104 accesses the second data buffer 1102, and so on. The approach of exchanging the data buffers with each other is described as an example, and should not be construed to limit the scope of the present invention. It is to be noted that, the best time for the exchange of the data buffers is when the processing unit 105 completes accessing paired left-eye and right-eye display data (for that the left-eye and right-eye display data are displayed in pairs) to avoid undesirably affecting image quality of the stereo image.

Figure 6:
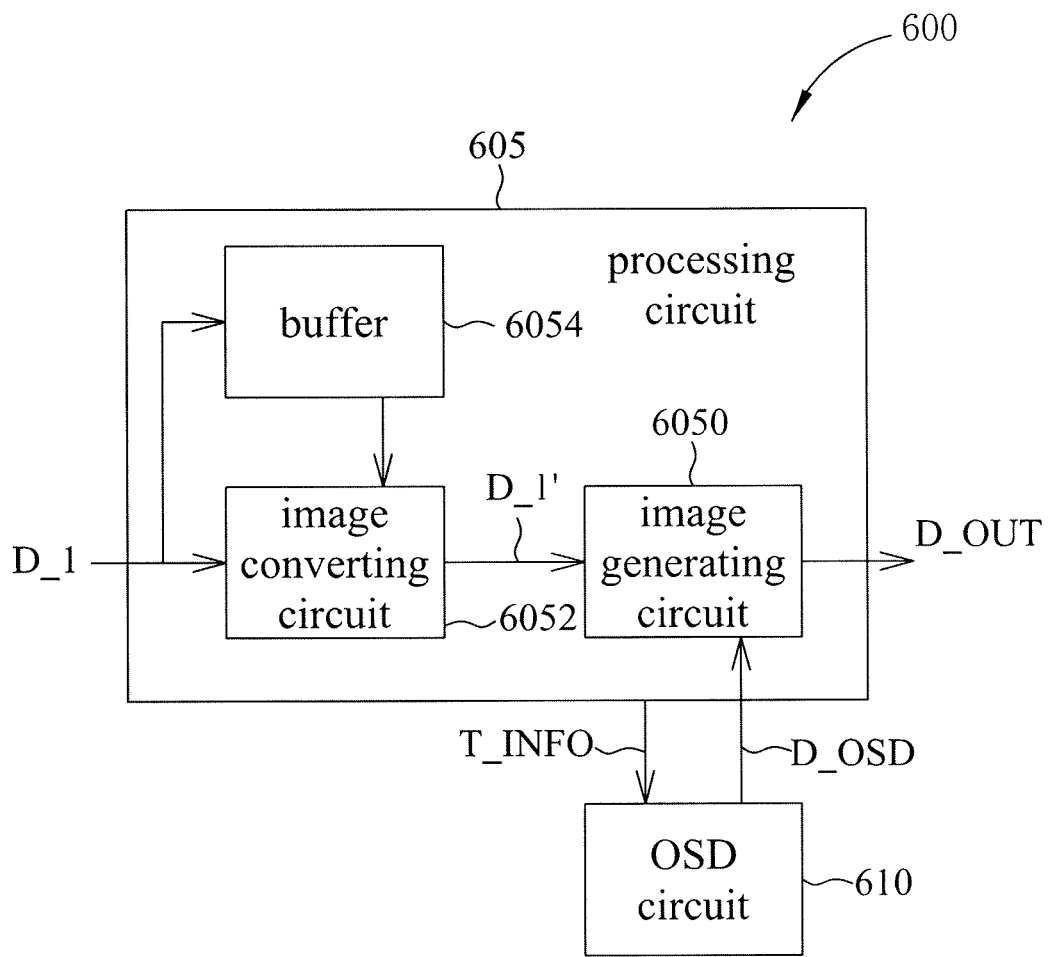
FIG. 6 is a schematic diagram of an image processing apparatus having an OSD function in accordance with a second embodiment of the present invention.

An OSD circuit can comprise an image converting function to convert the OSD data according to a data format of stereo image display of the display. FIG. 6 shows a schematic diagram of an image processing apparatus 600 having an OSD function in accordance with a second embodiment of the present invention. The image processing apparatus 600 comprises a processing circuit 605 and an OSD circuit 610. The processing circuit 605 comprises an image generating circuit 6050, an image converting circuit 6052, and a buffer 6054. The processing circuit 605 is also capable of receiving the foregoing image data D_1 and performing the image converting function on the image data D_1. A main difference between the processing circuit 605 and the processing circuit 105 is that, the image converting circuit 6052 converts the image data D_1 to a converted image data D_1' via the buffer 6054 according to the data format of the stereo image display of the display, and the image generating circuit 6050 performs image blending on the converted image data D_1' and the OSD data D_OSD to generate combined image data that is regarded as the output image data D_OUT. Operations and functions of the image converting circuit 6052, the image generating circuit 6050 and the buffer 6054 are similar to those of the image converting circuit 1052, the image generating circuit 1050 and the buffer 1054, and details thereof shall not be described for brevity. More specifically, the OSD data D_OSD outputted to the image generating circuit 6050 has been processed via the image converting of the data format of the stereo image display.

Figure 7A:
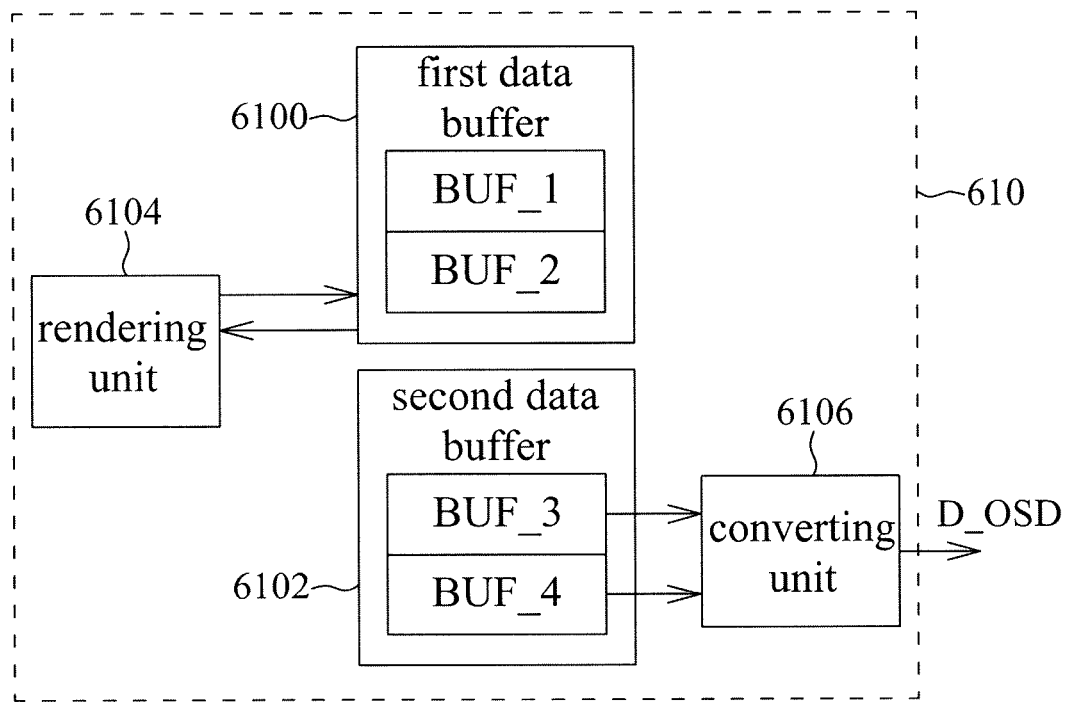
FIG. 7A to FIG. 7B are schematic diagrams of operations of an on-screen circuit in FIG. 6 in accordance with an embodiment of the present invention.
Figure 7B:
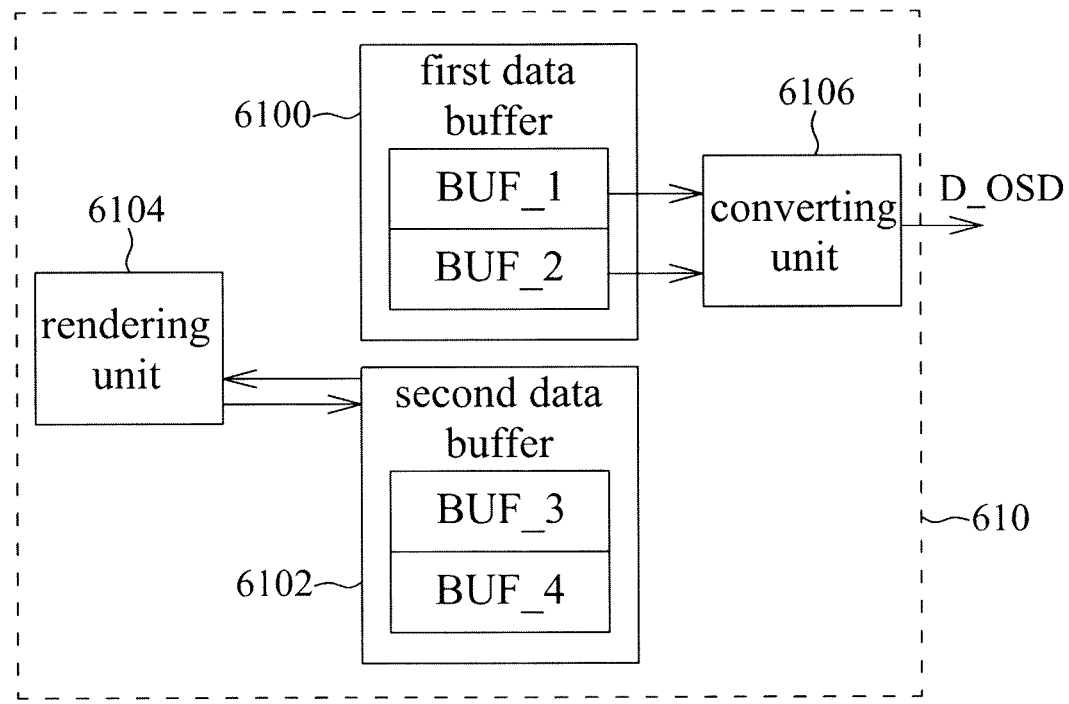

FIGS. 7A and 7B are schematic diagrams of operations of the OSD circuit 610 in FIG. 6 in accordance with an embodiment of the present invention. The OSD circuit 610 comprises a first data buffer 6100, a second data buffer 6102, a rendering unit 6104, and a converting unit 6106. Operations and functions of the first data buffer 6100, the second data buffer 6102 and the rendering unit 6104 are similar to those of the foregoing first data buffer 1100, the second data buffer 1102 and the rendering unit 1104, and details thereof shall not be described. A main difference is that, the converting unit 6106 accesses a display data buffer (e.g., the second data buffer 6102 in FIG. 7A or the first data buffer 6100 in FIG. 7B). That is, according to the data format of the stereo image display of the display, the converting unit 6106 first performs image converting on the left-eye and right-eye display data of the OSD data D_OSD, and outputs the processed OSD data D_OSD to the image generating circuit of the processing circuit 605. Therefore, the processing circuit 605 need not perform data format image converting on the received left-eye and right-eye display data.

Figure 8A:
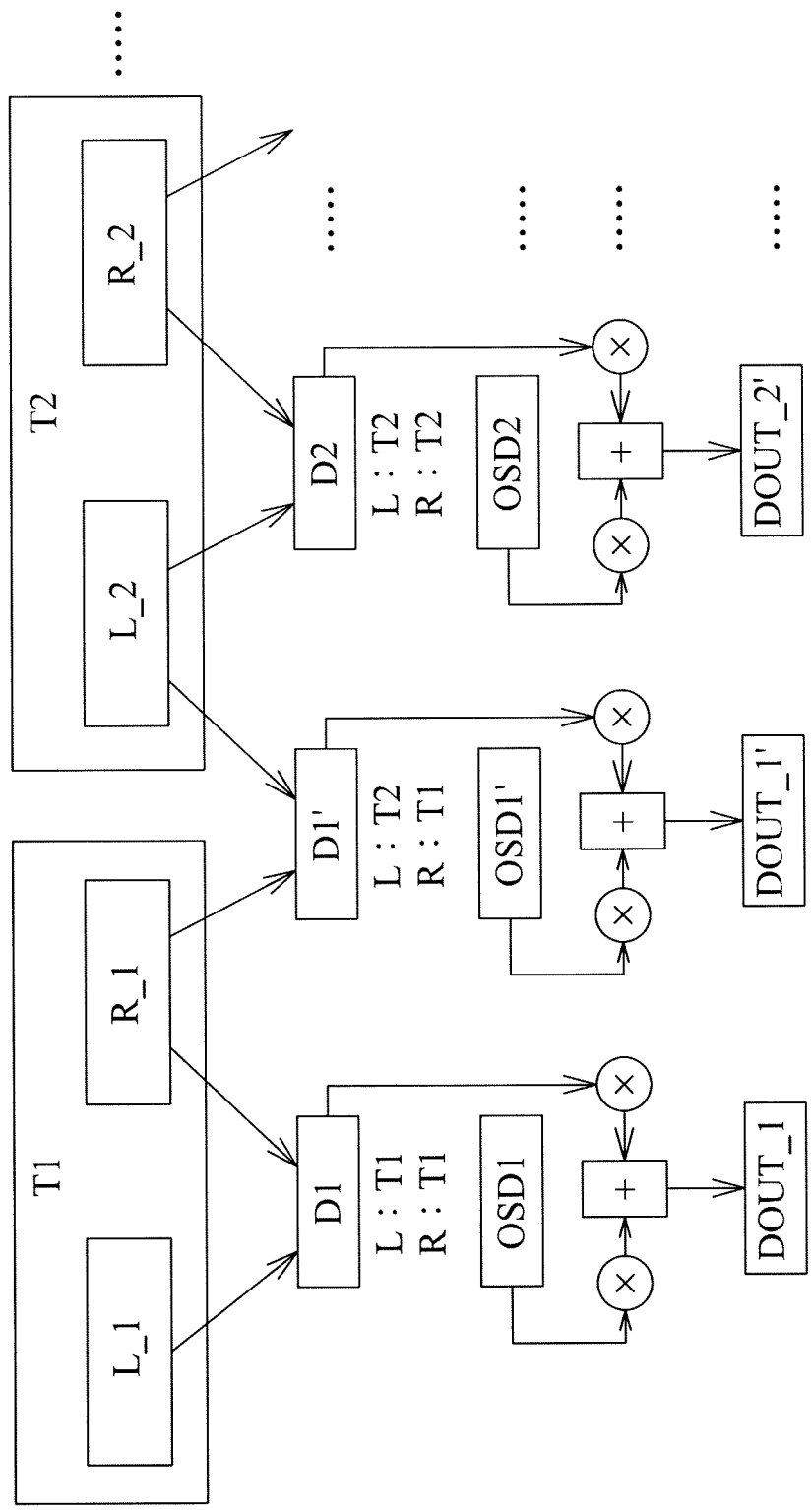
FIG. 8A is a schematic diagram of operations of a processing circuit in FIG. 6 in accordance with an embodiment of the present invention.

Likewise, in an embodiment, the image converting circuit 6054 generates converted image data D_1' corresponding to a current time point according to the data format of the stereo image display, left-eye image data of the image data D_1 and adjacent right-eye image data corresponding to the current time point. The image generating circuit 6050 performs image blending on the converted image data D_1' and the OSD data D_OSD to generate image data D_OUT. FIG. 8A shows a schematic diagram of the processing circuit 605 in FIG. 6 in accordance with an embodiment of the present invention. The left-eye image data L_1 is first temporarily stored in the buffer 6054, and upon receiving right-eye image data R1, the image converting circuit 6052 converts the left-eye image data L_1 stored in the buffer 6054 and the received right-eye image data R_1 based on the data format of the stereo image display to generate converted image data D1, e.g., the converted image data D1 has one of data formats of the frame F_0 as shown in FIG. 2B or FIG. 2C. Likewise, the right-eye image data R_1 is also temporarily stored in the buffer 6054, and upon receiving the left-eye image data L_2, the image converting circuit 6052 converts the right-eye image data R_1 stored in the buffer 6054 and the received left-eye image data L_2 based on the data format of the stereo image display to generate converted image data D1', e.g., the converted image data D1' has one of data formats of the frame F_1 as shown in FIG. 2B or FIG. 2C. Subsequent processing of other left-eye and right-eye image data is accordingly performed. It is to be noted that, in the foregoing embodiment, the image converting circuit 6052 performs image converting on left-eye and right-eye image data at different time points (e.g., the right-eye image data R_1 and the left-eye image data L_2); however, image quality observed by eyes of human beings is not over-affected. Therefore, the buffer 6054 only needs to temporarily store left-eye combined image data for one frame or right-eye combined image data for one frame at a previous time point.

The image generating circuit 6050 in sequence performs image blending on the converted image data D_1' outputted by the image converting circuit 6052 and OSD data received by the converting unit 6106 to generate the output image data D_OUT. For example, referring to FIG. 8A, the image converting circuit 6052 in sequence generates converted image data D1, D1', D2, D2', ..., DN and DN', and in sequence receives converted OSD data OSD1, OSD1', OSD2, OSD'2, ..., OSDN and OSDN'. The image generating circuit 6050 first multiplies the converted image data D1 and the converted OSD data OSD1 by weight values, respectively, and adds the two products to obtain a combined image data DOUT_1. Accordingly, combined image data DOUT_1, DOUT_1', DOUT_2, DOUT_2', ..., DOUT_N and DOUT_N' are in sequence generated as the output image data D_OUT.

Figure 8B:
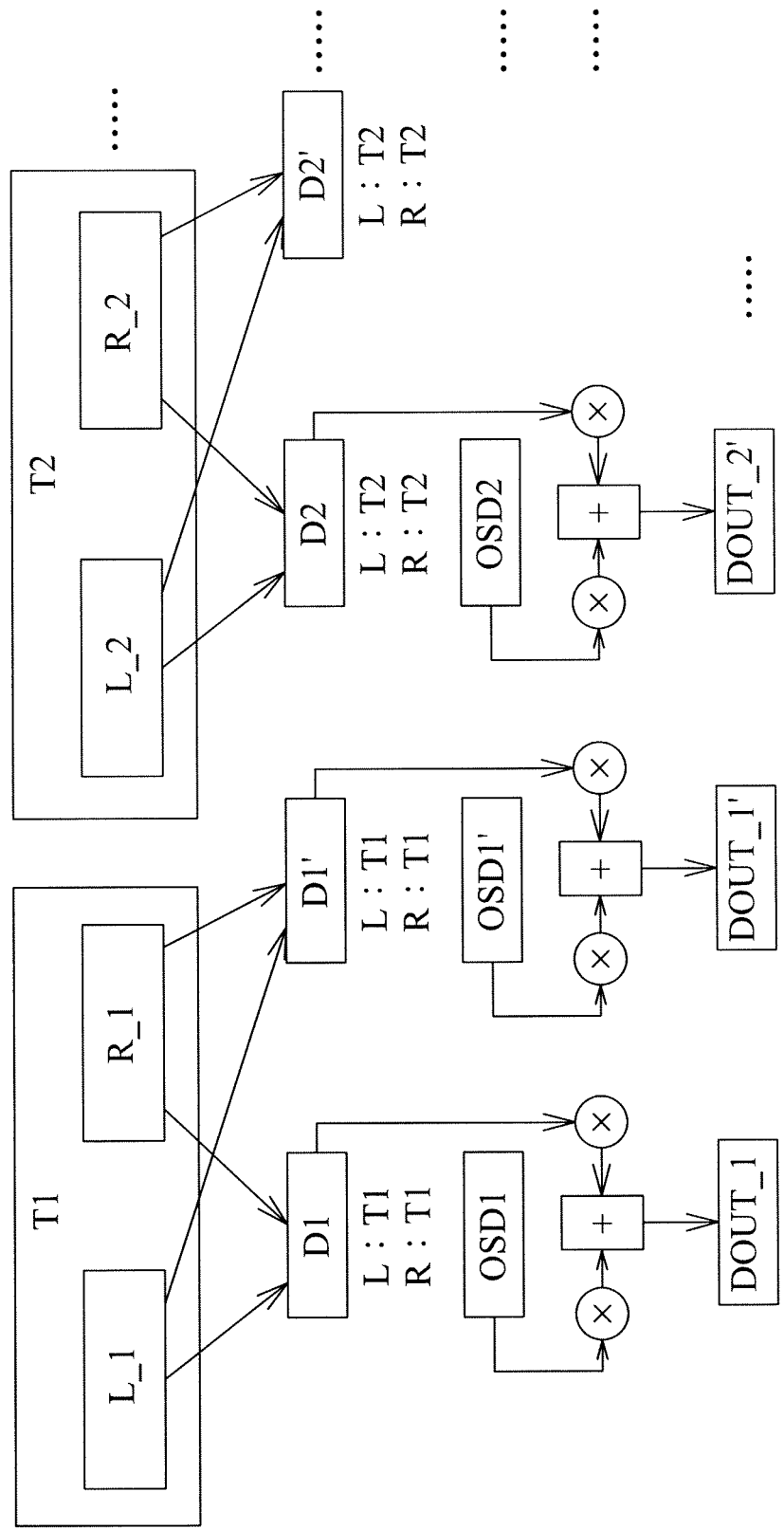
FIG. 8B is a schematic diagram of operations of a processing circuit in FIG. 6 in accordance with another embodiment of the present invention.

FIG. 8B shows a schematic diagram of operations of the processing circuit 605 in FIG. 6 in accordance with another embodiment of the present invention. The left-eye image data L_1 is first temporarily stored in the buffer 6054, and upon receiving the right-eye image data R_1, the image converting circuit 6052 performs stereo image data format conversion on the temporarily stored left-eye image data L_1 and the received right-eye image data R_1 to generate the data format of the frame F_0 as shown in FIG. 2B or FIG. 2C. The left-eye image data L_1 and the right-eye image data R_1 are temporarily stored in the buffer 6054, and upon receiving the left-eye image data L_2, the image converting circuit 6052 generates the data format of the frame F_1 as shown in FIG. 2B or FIG. 2C according to the left-eye image data L_1 and the right-eye image data R_1. Subsequent processing of other left-eye and right-eye image data are accordingly performed. As mentioned above, the buffer 6054 also needs to temporarily store the left-eye image data and the right-eye image data at a previous time point.

The processing circuit 105 in FIG. 1 and the processing circuit 605 in FIG. 6 can further comprise other image processing circuits, e.g., an image processing circuit prior to the image generating circuit 1050 performs other image processing on the image data D_1 (e.g., image scaling, de-interleaving, noise removing, chrominance enhancing), or an image processing circuit between the image generating circuit 1050 and the image converting circuit 1052 performs additional image processing on the combined image data D_COM. Likewise, an image processing circuit prior to the image converting circuit 6052 in FIG. 6 performs other image processing on the image data D_1, or an image processing circuit between the image converting circuit 6052 and the image generating circuit 6050 performs additional image processing on the converted image data D_1'.

Figure 9:
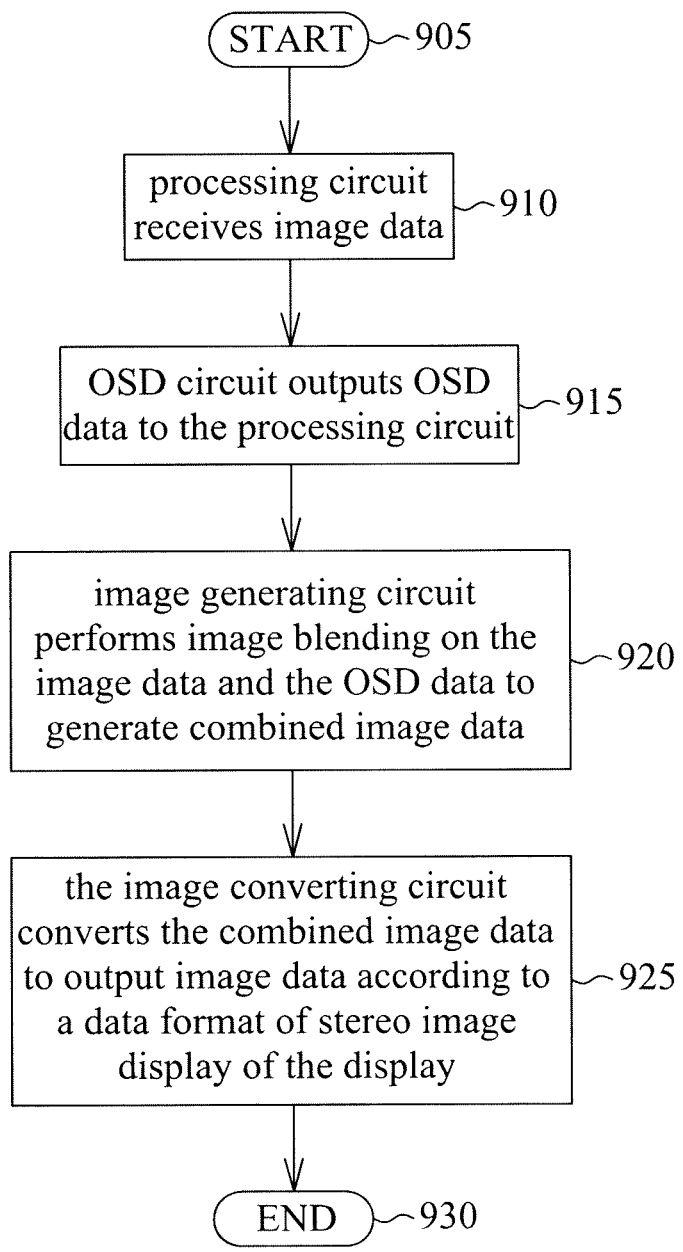
FIG. 9 is a flow chart of operations of the image processing apparatus in FIG. 1 in accordance with an embodiment of the present invention.
Figure 10:
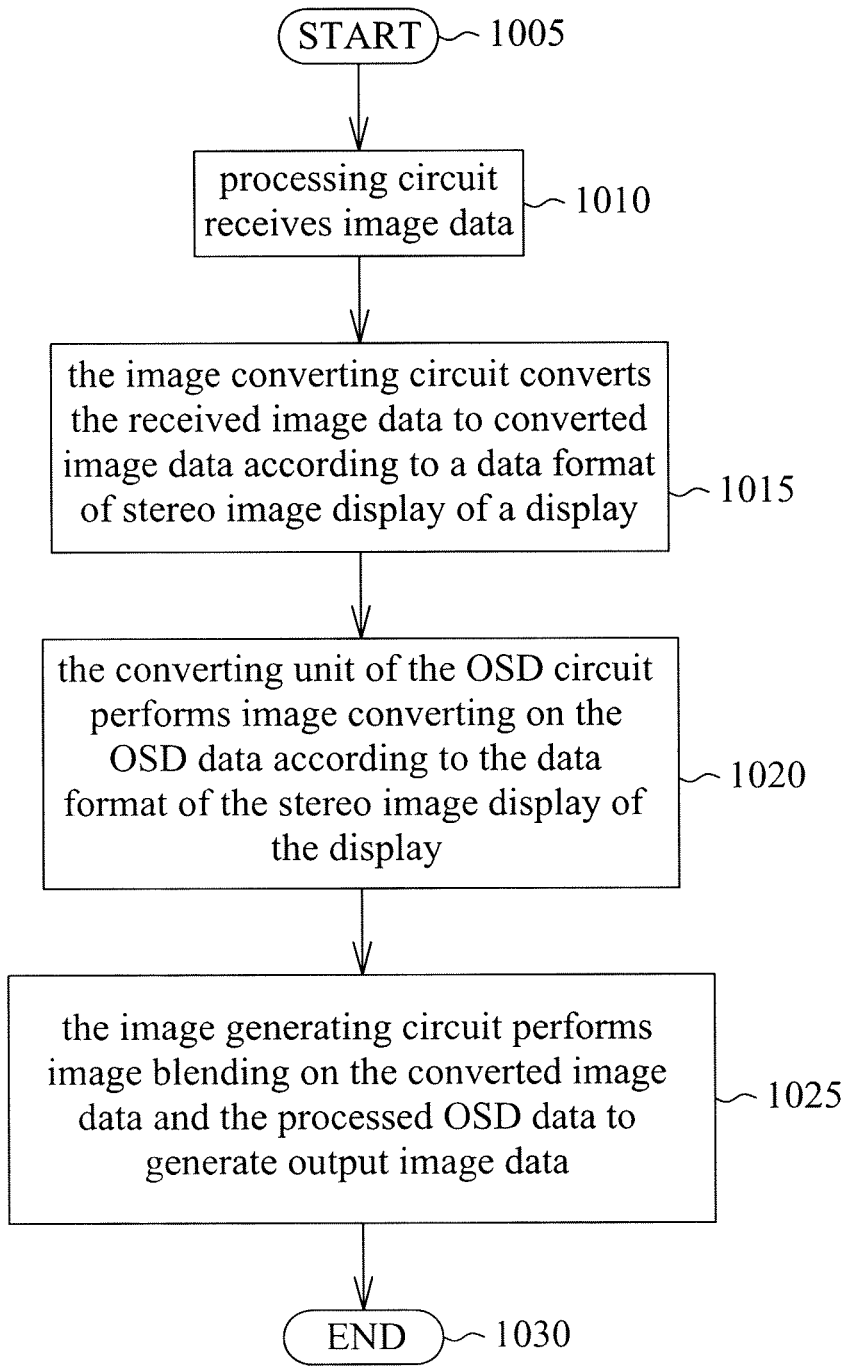
FIG. 10 is a flow chart of operations of the image processing apparatus in FIG. 6 in accordance with an embodiment of the present invention.

To provide a better understanding of differences between the first embodiment and the second embodiment to readers, following description is given with reference to FIG. 9 and FIG. 10 respectively showing flow charts of operations of the image processing apparatus 100 in FIG. 1 and the image processing apparatus 600 in FIG. 6. The steps in the flow charts need not be executed as the sequence shown in FIG. 9 or FIG. 10 nor be successive, provided that the same result is substantially achieved; that is to say, the steps in FIG. 9 or FIG. 10 can be interleaved with other steps. Corresponding to the image processing apparatus 100 in FIG. 1, an image processing method in FIG. 9 is described below.

The flow begins with Step 905. In Step 910, the processing circuit 105 receives image data D_1. In Step 915, the OSD circuit 110 outputs OSD data D_OSD to the processing circuit 105. In Step 920, the image generating circuit 1050 performs image blending on the image data D_1 and the OSD data D_OSD to generate combined image data D_COM. In Step 925, the image converting circuit 1052 converts the combined image data D_COM generated by the image generating circuit 1050 to output image data D_OUT according to a data format of stereo image display of the display. The flow ends Step 930.

Corresponding to the image processing apparatus 600 in FIG. 6, an image processing method in FIG. 10 is described below.

The flow begins with Step 1005. In Step 1010, the processing circuit 605 receives image data D_1. In Step 1015, the image converting circuit 6052 converts the received image data D_1 to converted image data D_1' according to a data format of stereo image display of the display. In Step 1020, the converting unit 6106 of the OSD circuit 610 first performs image converting on the OSD data according to the data format of the stereo image display of the display, and then outputs the processed OSD data D_OSD to the image generating circuit 6050. In Step 1025, the image generating circuit 6050 receives and performs image blending on the converted image data D_1' and the processed OSD data D_OSD to generate output image data D_OUT. The flow ends Step 1030.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image processing apparatus having an on-screen display (OSD) function, comprising:
    an OSD circuit, for generating OSD data comprising left-eye display data and right-eye display data, the OSD data configured to render at least a screen function list on a display; and
    a processing circuit, for processing image data comprising left-eye image data and right-eye image data;
    wherein the processing circuit respectively blends the left-eye display data and the right-eye display data of the OSD data with the left-eye image data and the right-eye image data of the image data to generate combined image data,
    wherein the processing circuit transmits timing information associated with the left-eye image data and the right-eye image data to the OSD circuit, which in sequence outputs the corresponding OSD data to the processing circuit in an interleaving manner according to the timing information, and
    wherein the OSD circuit comprises:
    a first data buffer;
    a second data buffer; and
    a rendering unit, respectively coupled to the first data buffer and the second data buffer, for generating the OSD data, the rendering unit storing first left-eye display data and first right-eye display data corresponding to a first time point into the first data buffer, and storing second left-eye display data and second right-eye display data corresponding to a second time point into the second data buffer;
    wherein, when the rendering unit writes the second left-eye display data and the second right-eye display data into the second data buffer, the processing circuit accesses data of the first data buffer.

2. The image processing apparatus as claimed in claim 1, applied to a display, wherein the processing circuit comprises:
    an image generating circuit, for performing image blending on the image data and the OSD data to generate the combined image data; and
    an image converting circuit, for converting the combined image data to output image data according to a data format of a stereo image display of the display.

3. The image processing apparatus as claimed in claim 2, wherein the combined image data comprises left-eye combined image data and right-eye combined image data; according to the data format of the stereo image display, the image converting circuit converts the left-eye combined image data and the right-eye combined image data corresponding to a same time point to first output data, and converts the left-eye combined image data and the right-eye combined image data corresponding to different time points, to second output data; and the first output data and the second output data form the output image data.

4. The image processing apparatus as claimed in claim 2, wherein the combined image data comprises left-eye combined image data and right-eye combined image data; and according to the data format of the stereo image display, the image converting circuit respectively converts each of left-eye combined image data and each of right-eye combined image data corresponding to a same time point to generate the output image data.

5. The image processing apparatus as claimed in claim 1, applied to a display, wherein the processing circuit comprises:
    an image converting circuit, for converting the image data to a converted image data according to a data format of stereo image display of the display; and
    an image generating circuit, for performing image blending on the converted image data and the OSD data to generate the combined image data.

6. The image processing apparatus as claimed in claim 5, wherein the OSD circuit comprises:
    a converting unit, for performing image converting on the OSD data according to the data format of the stereo image display of the display, and outputting the converted OSD data to the image generating circuit.

7. The image processing apparatus as claimed in claim 5, wherein according to the data format of stereo image display, the image converting circuit converts the left-eye image data and the right-eye image data corresponding to a same time point to first converted data, converts the left-eye image data and the right-eye image data corresponding to different time points to second converted data, and the first converted data and the second converted data form the converted image data.

8. The image processing apparatus as claimed in claim 5, wherein according to the data format of stereo image display, the image converting circuit respectively converts each of the left-eye image data and each of the right-eye image data corresponding to a same time point to the converted image data.

9. The image processing apparatus as claimed in claim 1, wherein when the rendering unit completes writing the second left-eye and right-eye display data into the second data buffer, and the processing unit completes accessing one pair or numerous pairs of the first left-eye and right-eye display data, the rendering unit switches to write next left-eye and right-eye display data into the first data buffer, and the processing unit switches to access the second left-eye and right-eye display data of the second data buffer.

10. An image processing method, comprising:
    generating OSD data comprising left-eye display data and right-eye display data, the OSD data configured to render at least a screen function list on a display;
    providing image data comprising left-eye image data and right-eye image data;
    respectively blending the left-eye display data and the right-eye display data of the OSD data with the left-eye image data and the right-eye image data of the image data to generate combined image data; and
    providing timing information associated with the left-eye image data and the right-eye image data;
    wherein, in the step of generating the combined image data, according to the timing information, the left-eye display data and the right-eye display data of the OSD data are provided in an interleaving manner and blended with the left-eye image data and the right-eye image data of the image data, and
    wherein the step of generating the OSD data comprises:
    storing first left-eye display data and first right-eye display data corresponding to a first time point into a first data buffer; and
    storing second left-eye display data and second right-eye display data corresponding to a second time point into a second data buffer;
    wherein, when the second left-eye display data and the second right-eye display data are written into the second data buffer, the step of generating the combined image data is to generate the combined image data according to data of the first data buffer.

11. The method as claimed in claim 10, applied to a display, the method further comprising:
    converting the combined image data to output image data according to a data format of a stereo image display of the display.

12. The method as claimed in claim 11, wherein the combined image data comprises left-eye combined image data and right-eye combined image data, and the step of converting the combined image data to the output image data comprises:
    converting the left-eye combined image data and the right-eye combined image data corresponding to a same time point to first output data; and
    converting the left-eye combined image data and the right-eye combined image data corresponding to different time points to second output data;
    wherein, the first output data and the second output data form the output image data.

13. The method as claimed in claim 11, wherein the combined image data comprises left-eye combined image data and right-eye combined image data, and the step of converting the combined image data to the output image data comprises:
    according to the data format of the stereo image display, respectively converting each of the left-eye combined image data and each of the right-eye combined image data corresponding to a same time point to generate the output image data.

14. The method as claimed in claim 10, applied to a display, wherein the step of generating the combined image data comprises:
    converting the image data to converted image data according to a data format of a stereo image display of the display; and
    performing image blending on the converted image data and the OSD data to generate the combined image data.

15. The method as claimed in claim 14, further comprising:
    performing image converting on the OSD data according to the data format of stereo image display of the display;
    wherein, in the step of generating the combined image data, the converted OSD data is blended with the image data to generate the combined image data.

16. The method as claimed in claim 10, wherein the step of generating the OSD data comprises:
    when the second left-eye display data and the second right-eye display data corresponding to the second time point are stored into the second data buffer, and the first data buffer outputs one pair or numerous pairs of the first left-eye and right-eye display data, next left-eye and right display data are stored into the first data buffer, and the second data buffer outputs the second left-eye display data and the second right-eye display data.

* * * * *